(12) United States Patent
Kim et al.

(10) Patent No.: US 12,162,465 B2
(45) Date of Patent: Dec. 10, 2024

(54) ELECTRONIC CONTROL UNIT STRUCTURE OF BRAKE SYSTEM

(71) Applicant: HL MANDO CORPORATION, Gyeonggi-do (KR)

(72) Inventors: Minseong Kim, Gyeonggi-do (KR); Sang Woo Kim, Gyeonggi-do (KR); Seungcho Han, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 277 days.

(21) Appl. No.: 17/617,282

(22) PCT Filed: Jun. 8, 2020

(86) PCT No.: PCT/KR2020/007418
§ 371 (c)(1),
(2) Date: Dec. 7, 2021

(87) PCT Pub. No.: WO2020/246865
PCT Pub. Date: Dec. 10, 2020

(65) Prior Publication Data
US 2022/0340113 A1   Oct. 27, 2022

(30) Foreign Application Priority Data

Jun. 7, 2019 (KR) .................. 10-2019-0067246
Jun. 7, 2019 (KR) .................. 10-2019-0067247
Jun. 7, 2019 (KR) .................. 10-2019-0067248

(51) Int. Cl.
*B60T 8/92* (2006.01)
*B60T 8/36* (2006.01)
(Continued)

(52) U.S. Cl.
CPC .............. *B60T 8/92* (2013.01); *B60T 8/368* (2013.01); *B60T 8/885* (2013.01); *B60T 13/745* (2013.01);
(Continued)

(58) Field of Classification Search
CPC . B60T 8/34; B60T 8/368; B60T 8/343; B60T 8/885; B60T 8/92; B60T 7/042;
(Continued)

(56) References Cited

U.S. PATENT DOCUMENTS

2009/0079259 A1   3/2009  Iwasaki et al.
2009/0189439 A1*  7/2009  Abe .................... G01L 19/0645
                                                     303/113.1
(Continued)

FOREIGN PATENT DOCUMENTS

| CN | 108639038 | 10/2018 |
| CN | 108944883 | 12/2018 |

(Continued)

OTHER PUBLICATIONS

International Search Report for PCT/KR2020/007418 mailed on Sep. 25, 2020 and its English translation from WIPO (now published as WO 2020/246865).
(Continued)

*Primary Examiner* — Robert A. Siconolfi
*Assistant Examiner* — San M Aung
(74) *Attorney, Agent, or Firm* — Womble Bond Dickinson (US) LLP

(57) ABSTRACT

The present invention relates to an electronic control unit (ECU) structure of a brake system. An ECU of a brake system, according to the present invention, has a redundancy configuration in which a first control unit, a first cover, and a second control unit are sequentially stacked so that the first control unit and the second control unit are spatially sepa- (Continued)

rated by means of the first cover, and thus the second control unit can perform the function of the first control unit without being influenced when the first control unit malfunctions.

9 Claims, 11 Drawing Sheets

(51) Int. Cl.
- *B60T 8/88* (2006.01)
- *B60T 13/74* (2006.01)
- *B60T 17/22* (2006.01)
- *H02K 3/50* (2006.01)
- *H02K 7/102* (2006.01)
- *H02K 11/21* (2016.01)
- *H02K 11/33* (2016.01)
- *H02P 25/22* (2006.01)
- *H02P 29/028* (2016.01)

(52) U.S. Cl.
CPC ............... *B60T 17/22* (2013.01); *H02K 3/50* (2013.01); *H02K 7/102* (2013.01); *H02K 11/21* (2016.01); *H02K 11/33* (2016.01); *H02P 25/22* (2013.01); *H02P 29/028* (2013.01); *B60T 13/74* (2013.01); *B60T 2220/04* (2013.01); *B60T 2270/10* (2013.01); *B60T 2270/304* (2013.01); *B60T 2270/402* (2013.01); *B60T 2270/403* (2013.01); *B60T 2270/404* (2013.01); *B60T 2270/413* (2013.01); *B60T 2270/82* (2013.01); *B60T 2270/88* (2013.01); *H02K 2203/09* (2013.01); *H02K 2211/03* (2013.01); *H02K 2213/06* (2013.01)

(58) Field of Classification Search
CPC ........ B60T 13/745; B60T 13/74; B60T 17/22; B60T 2220/04; B60T 2270/10; B60T 2270/82; B60T 2270/402; B60T 2270/88; B60T 2270/304; B60T 2270/413; B60T 2270/403; B60T 2270/404; H02K 11/33; H02K 3/50; H02K 11/21; H02K 2211/03; H02K 2213/06; H02P 25/22; H02P 29/028; H02P 3/04
USPC .......................................................... 303/20
See application file for complete search history.

(56) References Cited

U.S. PATENT DOCUMENTS

| | | | |
|---|---|---|---|
| 2009/0189441 A1 | 7/2009 | Degoul et al. | |
| 2011/0320099 A1 | 12/2011 | Kim | |
| 2013/0289842 A1 | 10/2013 | Dabbs | |
| 2014/0142829 A1 | 5/2014 | Strengert et al. | |
| 2015/0061362 A1* | 3/2015 | Kikawa | B60T 8/4077 303/14 |
| 2016/0009263 A1 | 1/2016 | Feigel et al. | |
| 2018/0065609 A1 | 3/2018 | Leiber et al. | |
| 2018/0099652 A1 | 4/2018 | Jung | |
| 2018/0118183 A1* | 5/2018 | Spieker | B60T 17/221 |
| 2019/0100237 A1 | 4/2019 | Klesing | |
| 2019/0217837 A1 | 7/2019 | Feigel | |
| 2019/0351884 A1* | 11/2019 | Tajima | F16D 65/183 |
| 2021/0163026 A1 | 6/2021 | Ochida et al. | |
| 2022/0073038 A1 | 3/2022 | Suzuki et al. | |
| 2022/0266805 A1 | 8/2022 | Park et al. | |
| 2024/0045426 A1 | 2/2024 | Ditty et al. | |

FOREIGN PATENT DOCUMENTS

| | | |
|---|---|---|
| CN | 108964561 | 12/2018 |
| CN | 109843672 | 6/2019 |
| JP | 2009-196626 | 9/2009 |
| JP | 2009-196627 | 9/2009 |
| JP | 2018-118700 | 8/2018 |
| KR | 10-2012-0000840 | 1/2012 |
| KR | 10-2016-0049807 | 5/2016 |
| KR | 10-2018-0126258 | 11/2018 |
| KR | 10-2019-0032597 | 3/2019 |
| KR | 10-2019-0038662 | 4/2019 |
| WO | 2018/210472 | 11/2018 |

OTHER PUBLICATIONS

Written Opinion of the International Searching Authority for PCT/KR2020/007418 mailed on Sep. 25, 2020 and its English translation by Google Translate (now published as WO 2020/246865).

Office Action dated Sep. 20, 2023 for Chinese Patent Application No. 202080042089.1 and its English machine translation from Google Translate.

Office Action dated Sep. 22, 2023 for Chinese Patent Application No. 202080042136.2 and its English machine translation from Google Translate.

Office Action dated Sep. 22, 2023 for Chinese Patent Application No. 202080042125.4 and its English machine translation from Google Translate.

Extended European Search Report dated Jul. 26, 2023 for European Patent Application No. 20819402.7.

Office Action dated Oct. 22, 2024 for Korean Patent Application No. 10-2020-0069323 and its English translation from Global Dossier.

Office Action dated Oct. 31, 2024 for Korean Patent Application No. 10-2020-0069325 and its English translation from Global Dossier.

Office Action dated Oct. 26, 2024 for Korean Patent Application No. 10-2020-0069324 and its English translation from Global Dossier.

\* cited by examiner

ELECTRONIC CONTROL UNIT STRUCTURE OF BRAKE SYSTEM

CROSS-REFERENCE TO RELATED APPLICATIONS

The present application is the national stage of International Patent Application No. PCT/KR2020/007418 filed on Jun. 8, 2020, which claims the priority to Korean Patent Application No. 10-2019-0067246 filed in the Korean Intellectual Office on Jun. 7, 2019, Korean Patent Application No. 10-2019-0067247 filed in the Korean Intellectual Office on Jun. 7, 2019, and Korean Patent Application No. 10-2019-0067248 filed in the Korean Intellectual Office on Jun. 7, 2019, the entire contents of which are incorporated herein by reference.

TECHNICAL FIELD

The present invention relates to a vehicle, and more particularly, to technology for controlling a brake for a vehicle.

BACKGROUND ART

A brake system is absolutely necessary for a vehicle. This is because a vehicle that cannot be stopped cannot travel. Therefore, for the safety of passengers, the stability of a brake system cannot be emphasized enough.

Recently, as an interest in autonomous vehicles and electric vehicles has increased, brake systems have also been required to have stronger braking power and stability. To this end, an electronic master booster has been used instead of the conventional hydraulic system, and an integrated dynamic brake (IDB) system, in which an anti-lock brake system (ABS) and an electronic stability control (ESC) system are integrated, has been developed. The use of such an IDB system has made it possible to reduce the size and weight of a brake system and has brought results of providing various functions and significantly improving stability.

However, since such an IDB system includes many electronic devices, the IDB system always has a risk of a failure. When, during driving of a vehicle, a brake system fails and is in an inoperable state, it can lead to a serious accident, and thus, it is necessary to prepare for the inoperable state of the brake system.

The inventors of the present invention have made efforts to solve the problems of brake systems according to the related art. As a result, the inventors of the present invention have completed the present invention after much effort to complete a system capable of normally operating a brake system in response to an unexpected situation even when a part of the brake system fails.

DISCLOSURE

Technical Problem

The present invention is directed to providing a brake system in which an entire system can operate normally even when a part of the system fails.

Meanwhile, other objects of the present invention which are not explicitly stated will be further considered within the scope easily deduced from the following detailed description and the effects thereof.

Technical Solution

According to an exemplary embodiment of the present invention, an electronic control unit (ECU) structure of a brake system includes a first control unit in which a first microcontroller unit (MCU) is disposed, a first cover positioned below the first control unit, a second control unit which is positioned below the first cover and in which a second MCU is disposed, a second cover positioned below the second control unit, and a housing positioned above the first control unit, wherein a dual winding motor is connected to the first control unit and the second control unit, and a motor position sensor, a coil, a pedal sensor, and a pressure sensor are connected to the first control unit or the second control unit.

The first control unit and the second control unit may be positioned in spaces that are physically separated by the first cover.

The first control unit and the second control unit may be connected to each other through a bus bar.

A first connector of the dual winding motor may be connected to the first control unit, a second connector of the dual winding motor may be connected to the second control unit, and an opening, through which the second connector of the dual winding motor is connected to the second control unit, may be formed in the first cover.

The pressure sensor may be connected to the first control unit through a contact spring, and the pressure sensor may be connected to the second control unit through a pattern of the first control unit and a bus bar between the first control unit and the second control unit.

The pressure sensor may include a first pressure sensor, a second pressure sensor, and a third pressure sensor, the first pressure sensor and the second pressure sensor may be connected directly to the first control unit and are connected to the first MCU through a pattern of the first control unit, and the third pressure sensor may be connected to the first control unit, may be connected to a bus bar, which connects the first control unit and the second control unit, though a pattern of the first control unit, and may be connected to the second MCU through a pattern of the second control unit connected to the bus bar.

The third pressure sensor may perform the same function as the first and second pressure sensors when the first and second pressure sensors fail and may perform a function in a state in which performance is degraded as compared with a case in which the first and second pressure sensors operate simultaneously.

The motor position sensor configured to measure a rotational position of the dual winding motor may be connected to the first control unit and may be connected to the second control unit through a bus bar between the first control unit and the second control unit.

The coil may include a first coil and a second coil, the first coil and the second coil may be connected to the first control unit, and the second coil may be connected to the second control unit through a pattern of the first control unit and a bus bar configured to connect the first control unit and the second control unit.

Advantageous Effects

According to the present invention, by providing redundant printed circuit boards (PCBs) having the same structure, even when one PCB fails, the redundant PCB performs the same function, and thus, it is possible to cope with an emergency situation, thereby increasing stability.

In addition, by providing a stacked structure of a PCB, there is an advantage that a brake system can be miniaturized.

The accompanying drawings are included to provide a further understanding of the technical idea of the present invention, and thus the scope of the present invention is not limited thereto.

MODES OF THE INVENTION

Hereinafter, a configuration of the present invention guided by various exemplary embodiments of the present invention and effects resulting from the configuration will be described with reference to the accompanying drawings. In describing the present invention, the detailed descriptions of the related known-functions that are obvious to a person skilled in the art and would unnecessarily obscure the subject of the present invention are omitted.

Terms such as "first," "second," and the like may be used to describe various components, but the components should not be limited by the above terms. The terms may be used only for the purpose of distinguishing one component from another component. For example, without departing from the scope of the present invention, a "first component" may be called a "second component," and similarly, a "second component" may also be called a "first component." In addition, a singular expression may include a plural expression, unless otherwise specified. The terms used in the exemplary embodiments of the present invention may be interpreted with the commonly known meaning to those of ordinary skill in the relevant technical field unless otherwise specified.

Hereinafter, a configuration of the present invention guided by various exemplary embodiments of the present invention and effects resulting from the configuration will be described with reference to the accompanying drawings.

Figure 1:
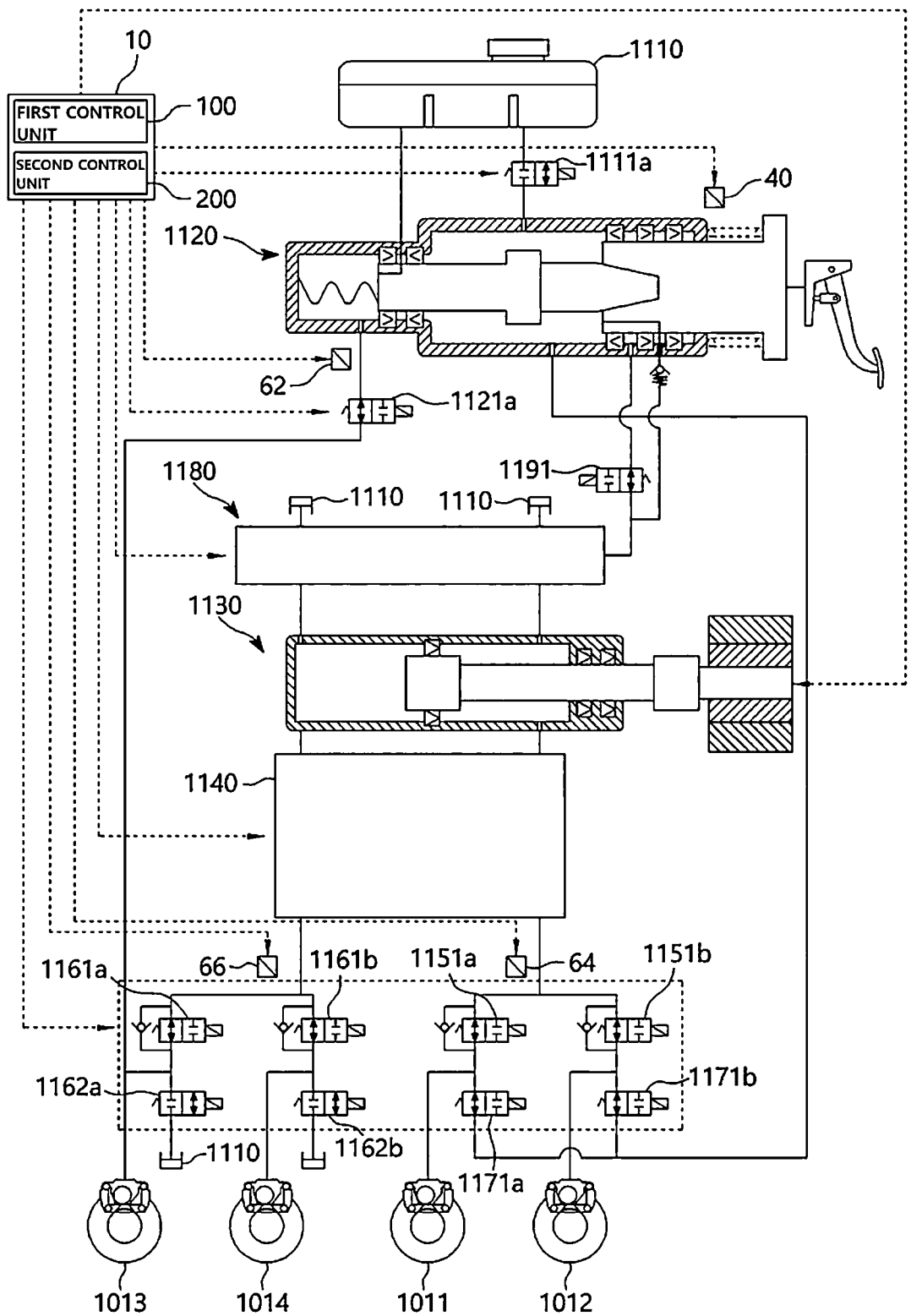
FIG. 1 is a schematic overall structural diagram of a brake system.

FIG. 1 is a schematic structural diagram of the entirety of a brake system according to an exemplary embodiment of the present invention.

The brake system includes a reservoir 1110, a master cylinder 1120, a hydraulic pressure supply device 1130, a hydraulic control unit 1140, a dump control unit 1180, valves and sensors for controlling flow paths, and an electronic control unit (ECU) for controlling the components.

The reservoir 1110 stores a pressure medium that flows along a flow path to generate pressure. The pressure medium flows to a required place according to an adjustment of a valve. A simulator valve 1111a formed in a flow path of the reservoir 1110 controls a flow of a pressure medium between the reservoir 1110 and the master cylinder 1120. During normal operation, the simulator valve 1111a is opened so that a user links the reservoir 1110 and the master cylinder 1120. In an abnormal operation mode, the simulator valve 1111a is closed so that a pressure medium of the master cylinder 1120 is transferred to valves for controlling wheel cylinders through a backup flow path.

When a driver presses a brake pedal, the master cylinder 1120 pressurizes and discharges a pressure medium such as brake oil accommodated therein. Thus, the master cylinder 1120 provides a reaction force according to a braking depression force to the driver. A cut valve 1121a controls a flow in a backup flow path between the master cylinder 1120 and the valves for controlling the wheel cylinders.

The hydraulic pressure supply device 1130 generates hydraulic pressure according to a position of a pedal and transmits the hydraulic pressure to the wheel cylinders of wheels 1011, 1012, 1013, and 1014, whereby a vehicle is braked. The hydraulic pressure supply device 1130 includes a motor to generate hydraulic pressure.

The hydraulic control unit 1140 controls the hydraulic pressure provided from the hydraulic pressure supply device 1130.

The dump control unit 1180 controls a flow of a pressure medium between the reservoir 1110 and the hydraulic pressure supply device 1130.

Each valve opens or closes a flow path formed between the reservoir 1110 and the master cylinder 1120 or the reservoir 1110 and the hydraulic pressure supply device 1130 to control a flow of a pressure medium. The valves are provided as check valves formed to allow only one direction flow without the need for control or solenoid valves of which opening and closing are controlled under control of an ECU 10.

Inlet valves 1161a, 1161b, 1151a, and 1151b control a flow of a pressure medium supplied from the hydraulic pressure supply device 1130 to the wheel cylinders.

Outlet valves 1162a and 1162b control a flow of a pressure medium discharged from the wheel cylinders to the reservoir 1110.

Furthermore, other outlet valves 1171a and 1171b control a flow of a pressure medium between the wheel cylinders and the master cylinder 1120.

A diagnostic valve 1191 is used when a diagnostic mode of examining a failure of other valves or a leak in a flow path is performed.

The ECU 10 receives signals from sensors 40, 62, 64, and 66 and controls the respective valves or the motor included in the hydraulic pressure supply device 1130 to control the operation of the brake system.

Figure 2:
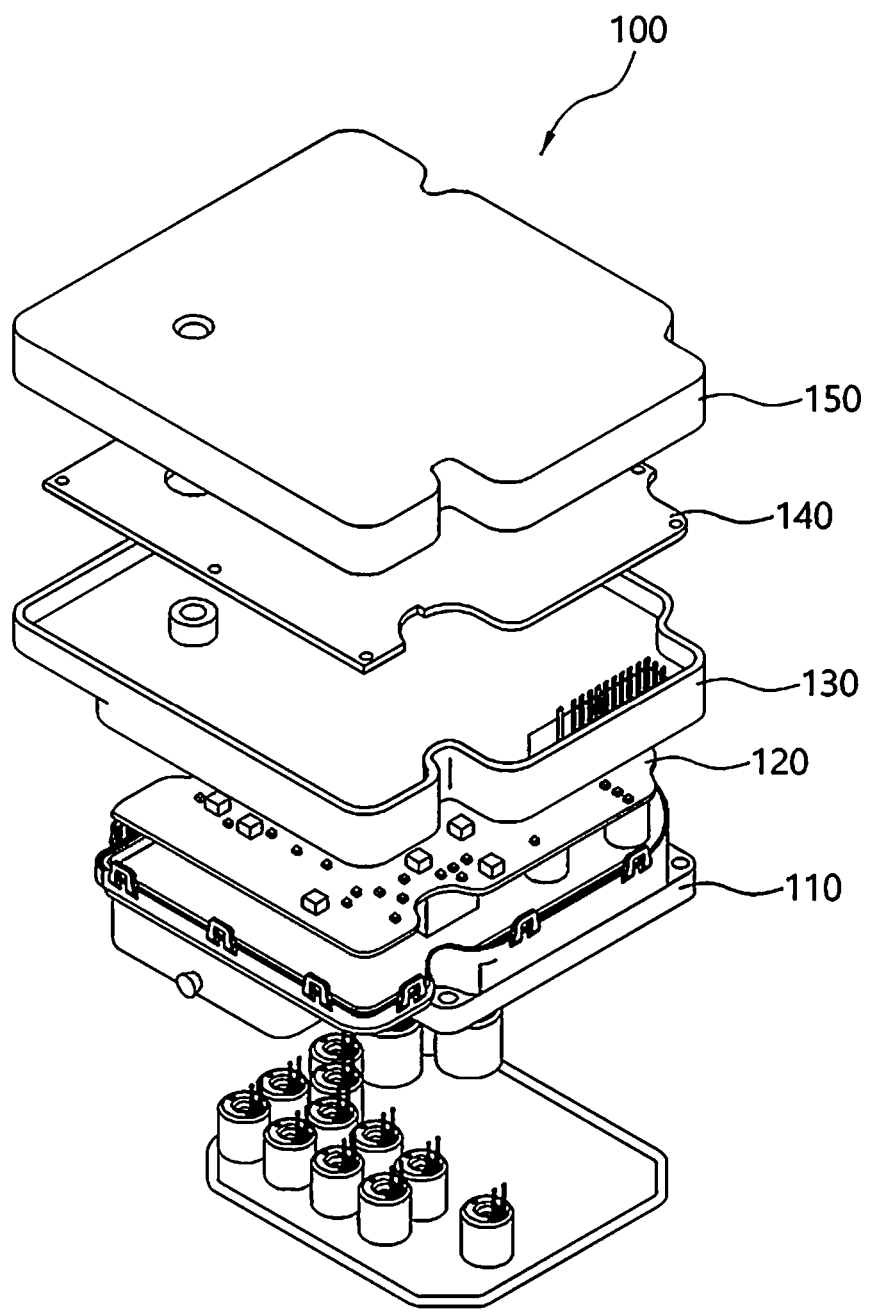
FIG. 2 is an exploded perspective diagram of an electronic control unit (ECU) according to an exemplary embodiment of the present invention.

FIG. 2 is an exploded perspective diagram of an overall structure of an ECU which is disassembled.

As shown, in an ECU 100 according to the present invention, a second control unit 140 may be disposed on a second cover 150. A first cover 130, a first control unit 120, and a housing 110 may be disposed on the second control unit 140, and a gasket may be disposed inside the housing 110.

The second cover 150 functions as a heat sink for the second control unit 140 to radiate heat of the ECU 100 to the outside. The second control unit 140 serves as a sub-printed circuit board (PCB).

The first control unit 120 is a main PCB, and the first cover 130 performs a heat sink function for the first control unit 120. In addition, the first cover 130 is connected to the second cover 150 to radiate heat to the outside of the ECU 100. The first cover 130 allows the first control unit 120 and the second control unit 140 to be positioned in physically separated spaces. Accordingly, the first control unit 120 and the second control unit 140 may communicate with each other through a bus bar passing through the first cover 130.

The ECU 100 according to the present invention may have a size of W196 mm×H172 mm×L73.5 mm, 14 solenoid coils may be disposed inside the housing 110, and a connector may have 46 pins.

Figure 3:
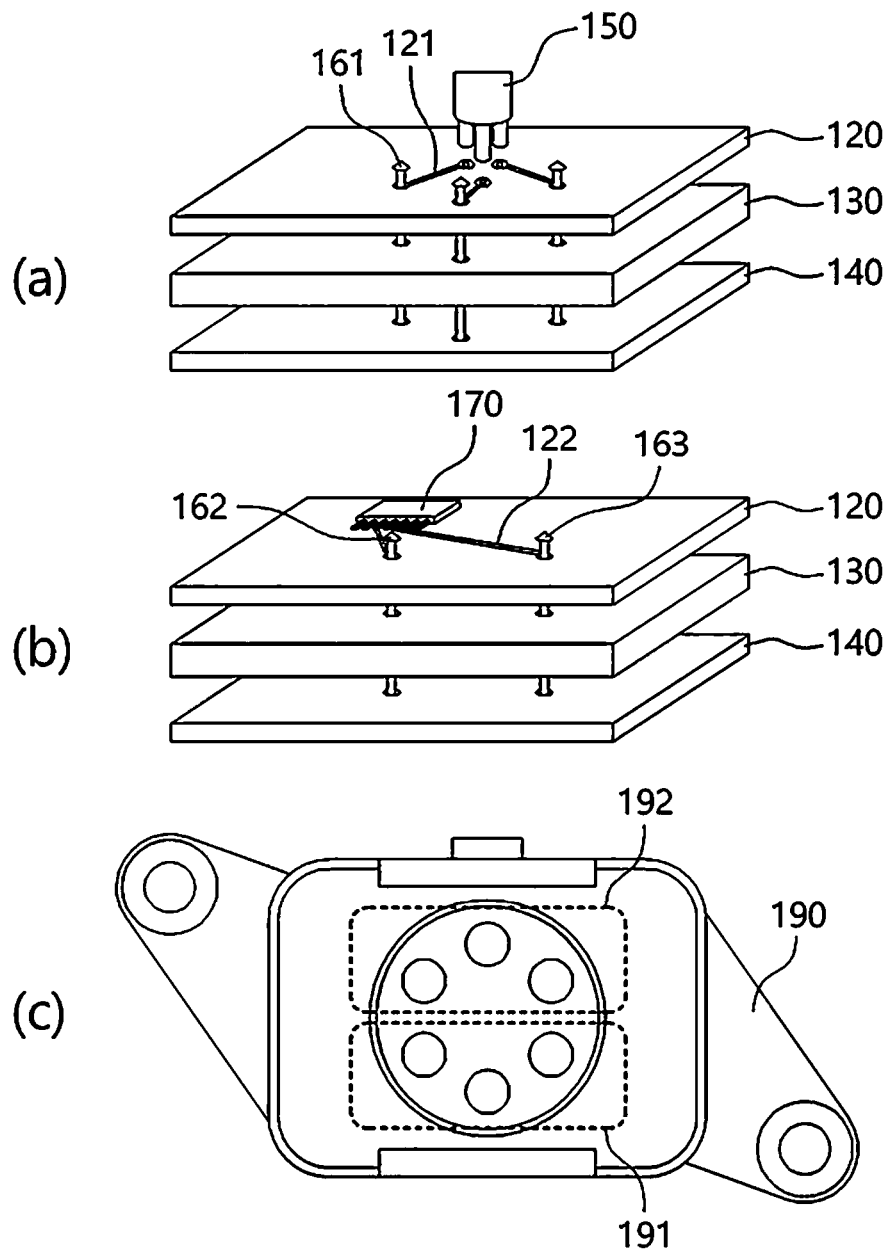
FIG. 3 shows diagrams illustrating arrangements of a pressure sensor, a motor position sensor (MPS), and a pedal sensor (PTS) in an ECU board according to an exemplary embodiment of the present invention.

FIG. 3 shows diagrams illustrating arrangements of a pressure sensor, a motor position sensor (MPS), and a pedal sensor (PTS) in an ECU board according to an exemplary embodiment of the present invention.

FIG. 3A illustrates an arrangement and a connection structure of the pressure sensor.

A pressure sensor 150 may be connected to a first control unit 120 in a press-fit manner. A contact spring of the pressure sensor 150 is connected to the first control unit 120 so that an input of the pressure sensor 150 is connected to a first bus bar 161 through a pattern 121 of the first control unit 120 and the first bus bar 161 passes through a first cover 130 to be connected to a second control unit 140. In the pressure sensor, a pedal simulator pressure (PSP) sensor and a circuit pressure (CIRP) sensor may be connected to the first control unit 120, and a sub-CIRP (SCIRP) sensor may be connected to the second control unit 140.

FIG. 3B illustrates an arrangement and a connection structure of the MPS.

The MPS is a two-die one-IC type and is mounted on a first control unit 120. Data of a second die among two dies is provided to second and third bus bars 162 and 163 through a pattern 122 of the first control unit 120 and provided to a second control unit 140. Power of a second die is supplied from the second control unit 140.

FIG. 3C illustrates a connection structure of the PTS.

The PTS may also be a two-die one-IC type and may use a contact spring like the pressure sensor, and a circular pressure sensor contact pad type may be used. A PTS 192 connected to a first control unit and a PTS 194 connected to a second control unit may be arranged in a circular shape.

The second PTS 194 has a structure in which, when a contact spring is connected to the first control unit and is connected to a bus bar through a pattern of the first control unit, the contact spring is connected to a second control unit through the bus bar. Power of a second die in which the second PTS 194 is positioned is supplied from a second control unit 140.

As described above, a circuit may be constructed such that an external PTS can be connected instead of an embedded PTS. In this case, a PTS (PDT) of one channel is connected to a first control unit 120, and a PTS (PDF) of the other channel is connected to a second control unit.

Figure 4:
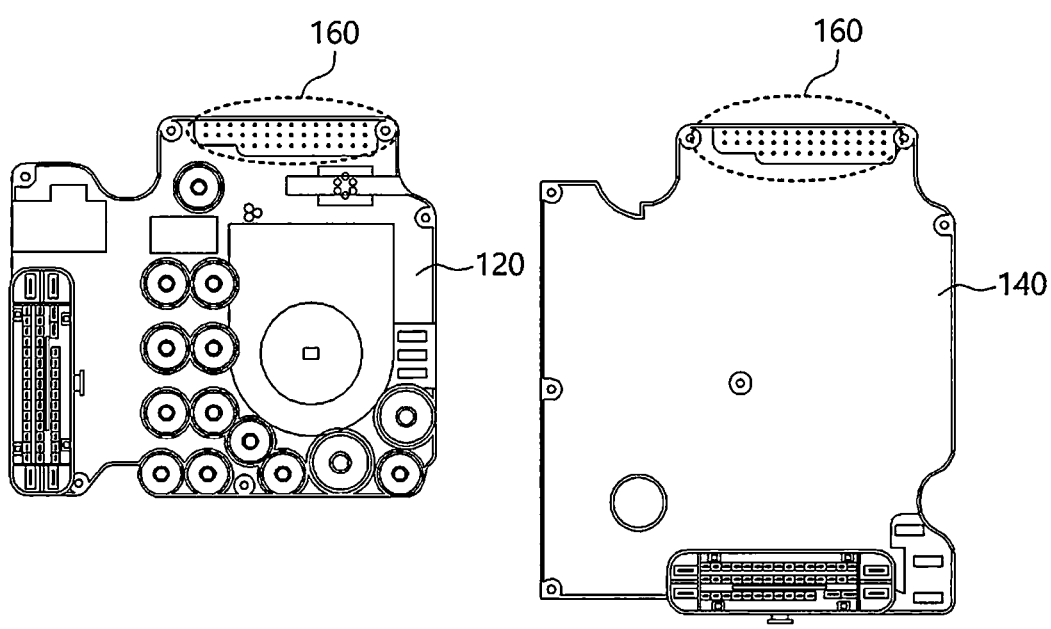
FIG. 4 shows diagrams of a bus bar connection structure of a first control unit and a second control unit according to an exemplary embodiment of the present invention.

FIG. 4 shows diagrams of a bus bar connection structure of a first control unit and a second control unit according to an exemplary embodiment of the present invention.

The bus bar connection structure is a structure in which a bus bar 160 passes through one side surface of a first control unit 120, and the same bus bar 160 passes through a second control unit 140 at a corresponding position so that the first control unit 120 and the second control unit 140 may transmit necessary signals.

Figure 5:
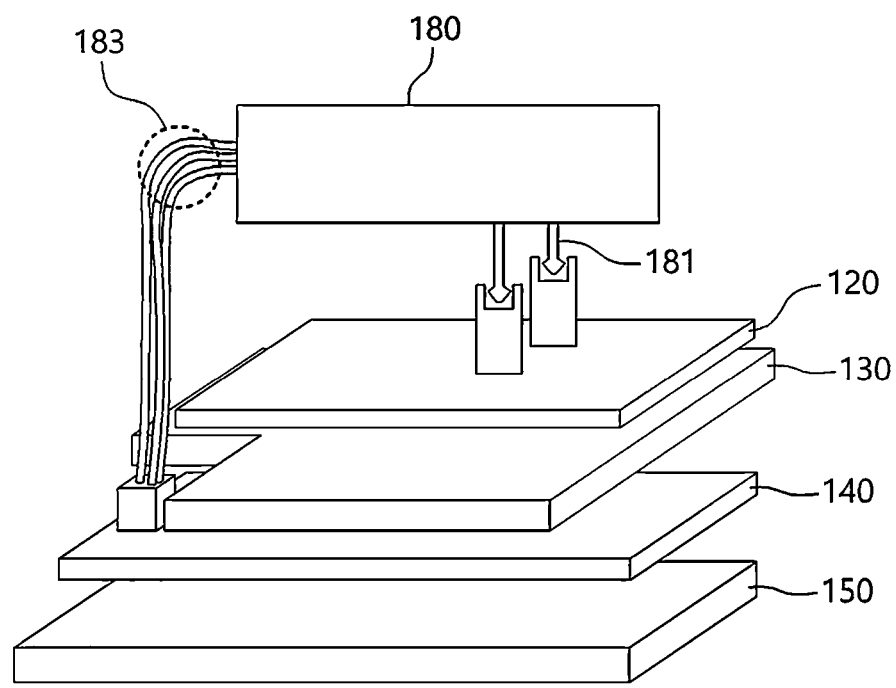
FIG. 5 is a diagram of a connection structure of a motor according to an exemplary embodiment of the present invention.
Figure 6:
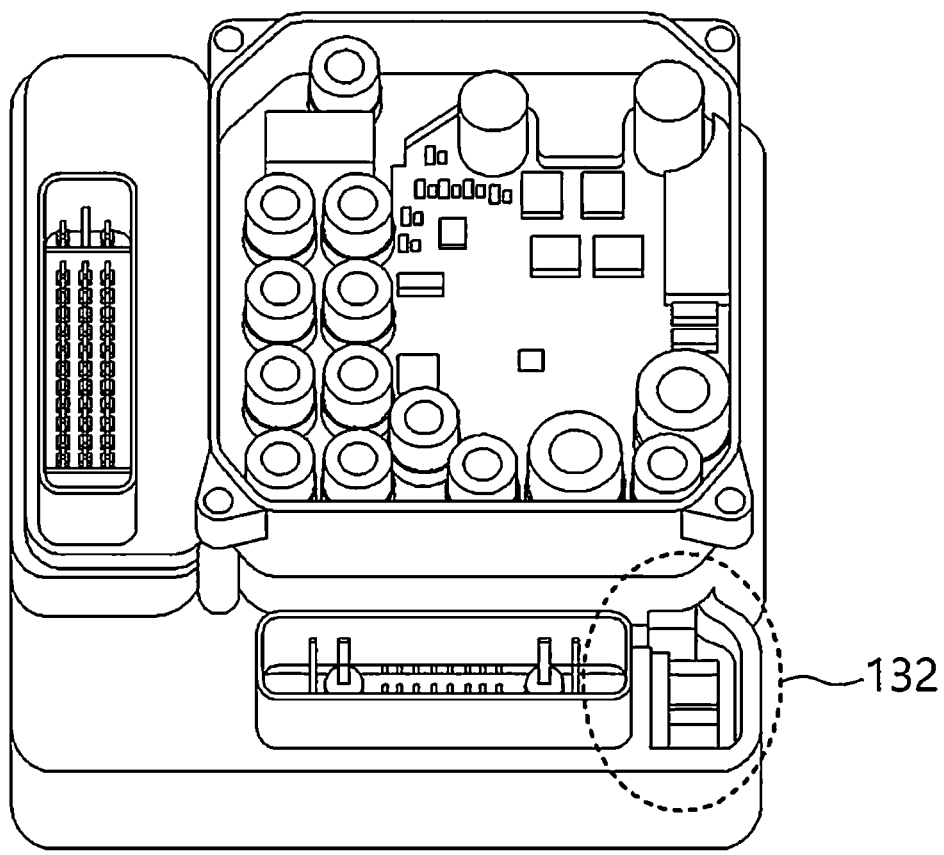
FIG. 6 illustrates a structure in which a second connector of the motor is connected to a second control unit.

FIG. 5 is a diagram of a connection structure of a motor according to an exemplary embodiment of the present invention, and FIG. 6 illustrates a structure in which a second connector of the motor is connected to a second control unit.

Since a first control unit 120 and a second control unit 140 have a stacked structure, connectors of a motor 180 have structures that cannot be simultaneously connected to two PCBs.

Accordingly, a first connector 181 of the motor has a structure that is connected directly to the first control unit 120, and a second connector 182 of the motor has a structure that is connected to the second control unit 140 through a wire 183.

Therefore, a first cover 130 between the first control unit 120 and the second control unit 140 should have a space for the wire 183 connected to the connector of the motor.

Thus, FIG. 6 illustrates an opening 132 for wire passing, through which the second wire 183 is connected to the second control unit, formed in the first cover 130. The wire may connect the connector of the motor 180 and the second control unit 140 through the opening 132.

Figure 7:
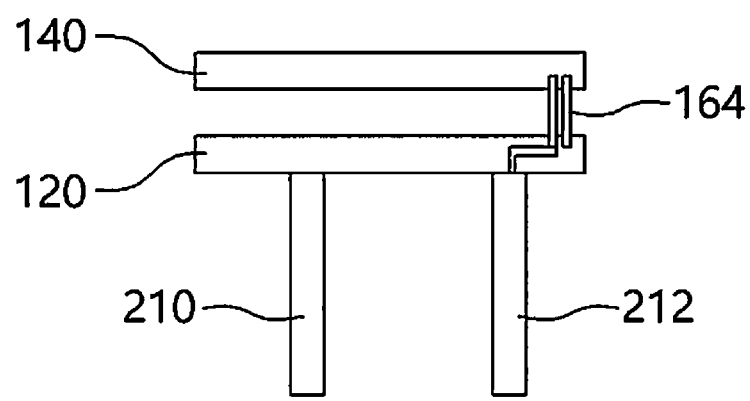
FIG. 7 illustrates a connection structure of a coil according to an exemplary embodiment of the present invention.

FIG. 7 illustrates a connection structure of a coil according to an exemplary embodiment of the present invention.

A first coil 210 and a second coil 212 may be connected to a first control unit 120 and a second control unit 140. However, in a stacked structure, the second coil 212 has a structure that cannot be connected directly to the second control unit 140.

Accordingly, the second coil 212 has a structure that is connected to the first control unit 120 and is connected to the second control unit 140 through a pattern of the first control unit 120 and a fourth bus bar 164.

Figure 8:
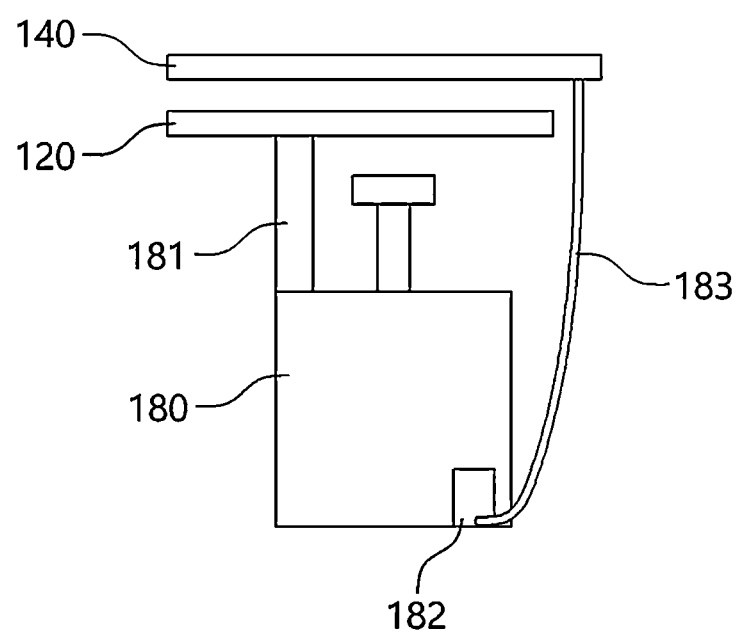
FIG. 8 illustrates a three-phase connector connection structure of a motor according to an exemplary embodiment of the present invention.

FIG. 8 illustrates a three-phase connector connection structure of a motor according to an exemplary embodiment of the present invention.

As shown, a first connector 181 of a motor 180 is connected directly to a first control unit 120, and a second connector 182 of the motor 180 is connected to a second control unit 140 through a wire 183. To this end, the motor 180 may be a motor having a double winding structure. When a double winding motor and a stacked PCB structure are used, even when one PCB fails, the motor can operate in a state in which performance is degraded.

Figure 9:
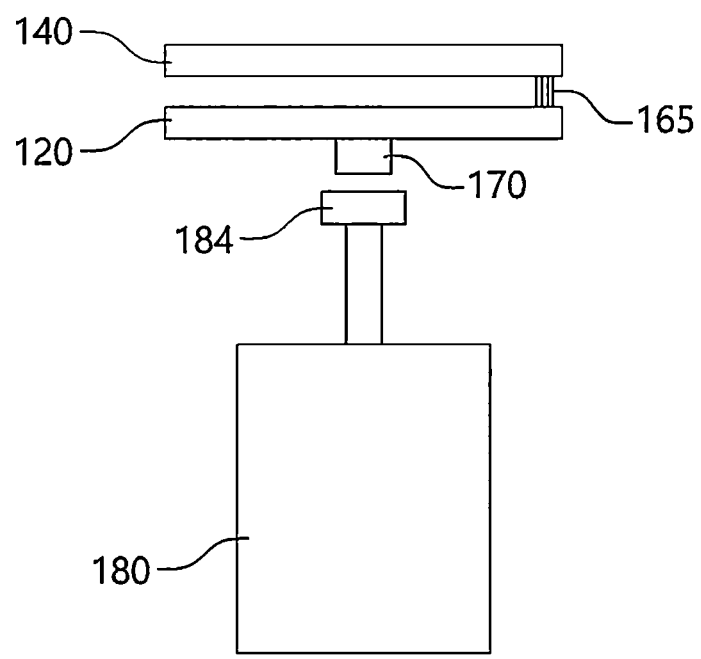
FIG. 9 illustrates a connection structure of an MPS according to an exemplary embodiment of the present invention.

FIG. 9 illustrates a connection structure of an MPS according to an exemplary embodiment of the present invention.

An MPS 170 is used to measure a rotational position of a head 184 of a motor 180. For optimal performance of the MPS 170, the MPS 170 may be positioned on an axis of the head 184 of the motor 180. Accordingly, the MPS 170 may be positioned on a rotation axis of the motor 180 of a first control unit 120, and a sensed value of the MPS 170 may be transmitted to a second control unit through a fifth bus bar 165.

Alternatively, a method is also possible in which one MPS 170 is positioned on one side surface of the first control unit 120, and another MPS is positioned on the other side surface of the first control unit 120 to then be connected onto a second control unit 140 using a bus bar.

Alternatively, another MPS may be connected directly onto the second control unit 140 at a position that coincides with a central axis of the motor 180.

Figure 10:
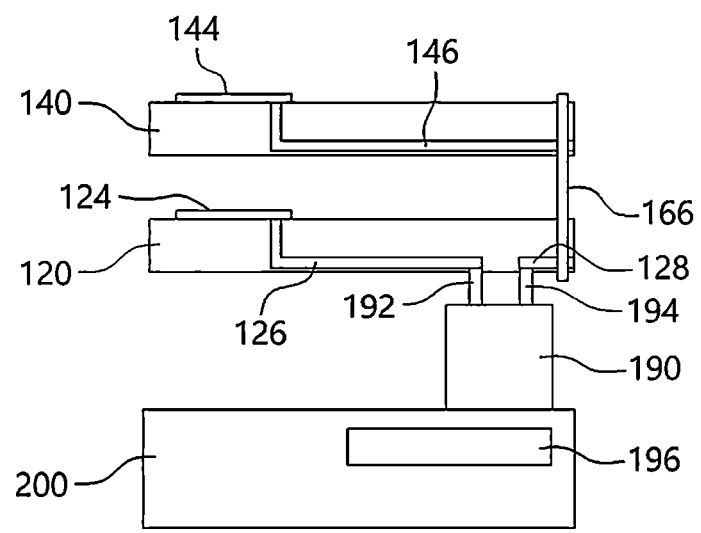
FIG. 10 illustrates a connection structure of a PTS according to an exemplary embodiment of the present invention.

FIG. 10 illustrates a connection structure of a PTS according to an exemplary embodiment of the present invention.

A PTS 190 may include a first channel 192 and a second channel 194. The PTS 190 is connected to a first control unit 120 in a press-fit manner, and the first channel 192 is connected to a first microcontroller unit (MCU) 124 through a first pattern 126 of the first control unit 120. The PTS 190 is positioned on a hydraulic control unit (HCU) block 200, and a magnet 196 is positioned in the HCU block 200.

The second channel 194 of the PTS 190 is also connected to the first control unit 120 in a press-fit manner and is connected to a sixth bus bar 166 through a second pattern 128 of the first control unit to be connected to a second control unit 140. In the second control unit 140, the sixth bus bar 166 is connected to a second MCU 144 through a third pattern 146.

Figure 11:
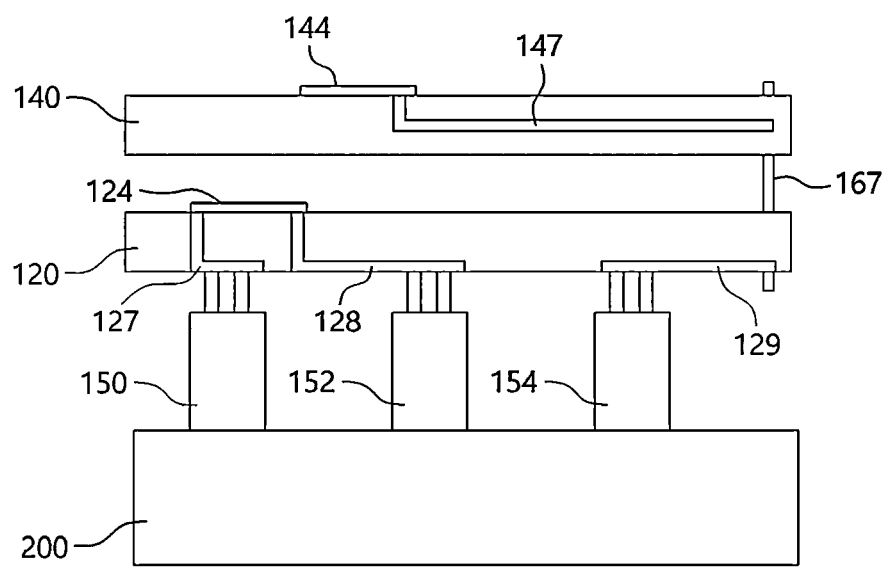
FIG. 11 illustrates a connection structure of a pressure sensor according to an exemplary embodiment of the present invention.

FIG. 11 illustrates a connection structure of a pressure sensor according to an exemplary embodiment of the present invention.

As pressure sensors 150, 152, and 154, three identical pressure sensors may be used.

A first pressure sensor 150 and a second pressure sensor 152 are connected directly to a first control unit 120.

A third pressure sensor 154 is connected to the first control unit 120 and is connected to a seventh bus bar 167 through a fourth pattern 129. The seventh bus bar 167 is connected to a second MCU 144 again through a pattern 147 of a second control unit 140 so that the third pressure sensor 154 is connected to the second MCU 144 of the second control unit 140. The first pressure sensor 150 may be a PSP sensor, the second pressure sensor 152 may be a CIRP sensor, and the third pressure sensor 154 may be a SCIRP sensor.

When the first pressure sensor 150 and the second pressure sensor 152 fail, one third pressure sensor 154 may perform functions of the first pressure sensor 150 and the second pressure sensor 152. However, when the functions are performed by the third pressure sensor 154 constituting redundancy, operation is performed in a state in which performance is degraded.

As described above, due to an ECU structure of a brake system in which a second control unit constitutes redundancy of a first control unit, there is an effect of stably operating the brake system using the second control unit when the first control unit does not operate normally.

The protection scope of the present invention is not limited to the disclosure and expressions of the exemplary embodiment clearly described above. In addition, it is added that the protection scope of the present invention is not limited by modifications and substitutions obvious to the technical field to which the present invention pertains.

The invention claimed is:

1. An electronic control unit (ECU) structure of a brake system, comprising:
   a first control unit in which a first microcontroller unit (MCU) is disposed;
   a first cover positioned below the first control unit;
   a second control unit which is positioned below the first cover and in which a second MCU is disposed;
   a second cover positioned below the second control unit and directly coupled to the first cover positioned below the first control unit; and
   a housing positioned above the first control unit,
   wherein:
   a dual winding motor is connected to the first control unit and the second control unit; and
   a motor position sensor, a coil, a pedal sensor, and a pressure sensor are connected to the first control unit or the second control unit.

2. The ECU structure of claim 1, wherein the first control unit and the second control unit are positioned in spaces that are physically separated by the first cover.

3. The ECU structure of claim 1, wherein the first control unit and the second control unit are connected to each other through a bus bar.

4. The ECU structure of claim 1, wherein:
   a first connector of the dual winding motor is connected to the first control unit;
   a second connector of the dual winding motor is connected to the second control unit; and
   an opening, through which the second connector of the dual winding motor is connected to the second control unit, is formed in the first cover.

5. The ECU structure of claim 1, wherein:
   the pressure sensor is connected to the first control unit through a contact spring; and
   the pressure sensor is connected to the second control unit through a pattern of the first control unit and a bus bar between the first control unit and the second control unit.

6. The ECU structure of claim 1, wherein:
   the pressure sensor includes a first pressure sensor, a second pressure sensor, and a third pressure sensor;
   the first pressure sensor and the second pressure sensor are connected directly to the first control unit and are connected to the first MCU through a pattern of the first control unit; and
   the third pressure sensor is connected to the first control unit, is connected to a bus bar, which connects the first control unit and the second control unit, though a pattern of the first control unit, and is connected to the second MCU through a pattern of the second control unit connected to the bus bar.

7. The MCU structure of claim 6, wherein the third pressure sensor performs the same function as the first and second pressure sensors when the first and second pressure sensors fail and performs a function in a state in which performance is degraded as compared with a case in which the first and second pressure sensors operate simultaneously.

8. The MCU structure of claim 1, wherein the motor position sensor configured to measure a rotational position of the dual winding motor is connected to the first control unit and is connected to the second control unit through a bus bar between the first control unit and the second control unit.

9. The MCU structure of claim 1, wherein:
   the coil includes a first coil and a second coil;
   the first coil and the second coil are connected to the first control unit; and
   the second coil is connected to the second control unit through a pattern of the first control unit and a bus bar configured to connect the first control unit and the second control unit.

* * * * *